US009454659B1

(12) United States Patent
Daymont

(10) Patent No.: US 9,454,659 B1
(45) Date of Patent: Sep. 27, 2016

(54) SOFTWARE VULNERABILITIES DETECTION SYSTEM AND METHODS

(71) Applicant: Securisea, Inc., Atlanta, GA (US)

(72) Inventor: Joshua M. Daymont, San Francisco, CA (US)

(73) Assignee: SECURISEA, INC., Atlanta, GA (US)

( * ) Notice: Subject to any disclaimer, the term of this patent is extended or adjusted under 35 U.S.C. 154(b) by 301 days.

(21) Appl. No.: 14/460,636

(22) Filed: Aug. 15, 2014

(51) Int. Cl.
| | | |
|---|---|---|
| *G06F 21/00* | (2013.01) | |
| *G06F 21/56* | (2013.01) | |
| *G06F 11/36* | (2006.01) | |
| *G06F 11/00* | (2006.01) | |
| *G06F 12/14* | (2006.01) | |
| *G06F 12/16* | (2006.01) | |
| *G08B 23/00* | (2006.01) | |

(52) U.S. Cl.
CPC ......... *G06F 21/566* (2013.01); *G06F 11/3668* (2013.01); *G06F 2221/033* (2013.01); *G06F 2221/034* (2013.01)

(58) Field of Classification Search
None
See application file for complete search history.

(56) References Cited

U.S. PATENT DOCUMENTS

| | | |
|---|---|---|
| 5,210,837 A | 5/1993 | Wiecek |
| 5,586,328 A | 12/1996 | Caron et al. |
| 5,671,419 A | 9/1997 | Carini et al. |
| 5,787,287 A | 7/1998 | Bharadwaj |
| 5,790,858 A | 8/1998 | Vogel |
| 5,854,924 A | 12/1998 | Rickel et al. |
| 5,872,949 A | 2/1999 | Kikuta et al. |
| 6,071,317 A | 6/2000 | Nagel |
| 6,078,745 A | 6/2000 | De Greef et al. |
| 6,226,789 B1 | 5/2001 | Tye et al. |

(Continued)

FOREIGN PATENT DOCUMENTS

| | | |
|---|---|---|
| CN | 101017458 A | 8/2007 |
| EP | 1870829 A1 | 12/2007 |

(Continued)

OTHER PUBLICATIONS

Bergeron et al., Static Analysis of Binary Code to Isolate Malicious Behaviors, Proceedings IEEE 8th International Workshops on Enabling Technologies: Infrastructure for Collaborative Enterprises (WET ICE'99), 1999, DOI: 10.1109/ENABL.1999.805197.

(Continued)

*Primary Examiner* — Shin-Hon Chen
(74) *Attorney, Agent, or Firm* — Asif Ghias

(57) ABSTRACT

This invention teaches a system and methods of detecting software vulnerabilities in a computer program by analyzing the compiled code and optionally the source code of the computer program. The invention models compiled software to examine both control flow and dataflow properties of the target program. A comprehensive instruction model is used for each instruction of the compiled code, and is complemented by a control flow graph that includes all potential control flow paths of the instruction. A data flow model is used to record the flow of unsafe data during the execution of the program. The system analyzes the data flow model and creates a security finding corresponding to each instruction that calls an unsafe function on unsafe data. These security findings are aggregated in a security report along with the corresponding debug information, any ancillary information, remediation recommendations and the optional source code information for each instruction that triggered the security finding.

26 Claims, 6 Drawing Sheets

(56) References Cited

U.S. PATENT DOCUMENTS

| | | |
|---|---|---|
| 6,389,587 B1 | 5/2002 | Lewis |
| 6,883,101 B1 | 4/2005 | Fox et al. |
| 6,981,279 B1 | 12/2005 | Arnold et al. |
| 7,051,208 B2 | 5/2006 | Venkatesan et al. |
| 7,076,804 B2 | 7/2006 | Kershenbaum et al. |
| 7,240,332 B2 | 7/2007 | Berg et al. |
| 7,284,274 B1 | 10/2007 | Walls et al. |
| 7,424,746 B1 | 9/2008 | Magdych et al. |
| 7,426,721 B1 | 9/2008 | Saulpaugh et al. |
| 7,430,670 B1 | 9/2008 | Horning et al. |
| 7,434,260 B2 | 10/2008 | Hong et al. |
| 7,530,107 B1 | 5/2009 | Ono et al. |
| 7,536,680 B2 | 5/2009 | Berry et al. |
| 7,752,609 B2 | 7/2010 | Rioux |
| 7,788,235 B1 | 8/2010 | Yeo |
| 7,877,812 B2 | 1/2011 | Koved et al. |
| 7,933,946 B2 | 4/2011 | Livshits et al. |
| 7,971,193 B2 | 6/2011 | Li et al. |
| 7,975,306 B2 | 7/2011 | Chess et al. |
| 8,239,939 B2 | 8/2012 | Dunagan et al. |
| 8,266,700 B2 | 9/2012 | Sima et al. |
| 8,266,702 B2 | 9/2012 | Naldurg et al. |
| 8,296,254 B2 | 10/2012 | Yamaoka |
| 8,321,840 B2 | 11/2012 | Nagarajan et al. |
| 8,327,339 B2 | 12/2012 | Schotz et al. |
| 8,347,392 B2 | 1/2013 | Chess et al. |
| 8,365,155 B2 | 1/2013 | Rioux |
| 8,380,841 B2 | 2/2013 | Dunagan et al. |
| 8,381,192 B1* | 2/2013 | Drewry ............... G06F 11/3624 712/233 |
| 8,397,300 B2* | 3/2013 | Tripp ................. G06F 11/3636 717/124 |
| 8,402,547 B2 | 3/2013 | Wiegenstein et al. |
| 8,407,800 B2 | 3/2013 | Schloegel et al. |
| 8,423,965 B2 | 4/2013 | Goel et al. |
| 8,434,070 B2 | 4/2013 | Artzi et al. |
| 8,468,605 B2 | 6/2013 | Haviv et al. |
| 8,499,353 B2 | 7/2013 | Lockhart et al. |
| 8,510,827 B1 | 8/2013 | Leake et al. |
| 8,516,443 B2 | 8/2013 | Li et al. |
| 8,528,093 B1 | 9/2013 | Kureha et al. |
| 8,528,095 B2 | 9/2013 | Haviv et al. |
| 8,539,466 B2 | 9/2013 | Abadi et al. |
| 8,584,239 B2 | 11/2013 | Aziz et al. |
| 8,584,246 B2 | 11/2013 | Haviv et al. |
| 8,613,080 B2 | 12/2013 | Wysopal et al. |
| 8,627,465 B2 | 1/2014 | Guy et al. |
| 8,667,584 B2 | 3/2014 | Berg et al. |
| 8,683,599 B2 | 3/2014 | Berg et al. |
| 8,739,280 B2 | 5/2014 | Chess et al. |
| 8,756,587 B2 | 6/2014 | Pistoia et al. |
| 8,793,665 B2 | 7/2014 | Murthy |
| 8,806,464 B2 | 8/2014 | Dewey |
| 8,813,033 B2 | 8/2014 | Sreedhar |
| 8,819,644 B2 | 8/2014 | Kalman et al. |
| 8,844,046 B2 | 9/2014 | Guarnieri et al. |
| 8,887,287 B2 | 11/2014 | Garay et al. |
| 2001/0020272 A1 | 9/2001 | Le Pennec et al. |
| 2003/0172293 A1 | 9/2003 | Johnson et al. |
| 2004/0073445 A1 | 4/2004 | Mellinger et al. |
| 2005/0198526 A1 | 9/2005 | Marr et al. |
| 2005/0273854 A1 | 12/2005 | Chess et al. |
| 2005/0273859 A1 | 12/2005 | Chess et al. |
| 2005/0273860 A1 | 12/2005 | Chess et al. |
| 2006/0021055 A1 | 1/2006 | Judge et al. |
| 2006/0090206 A1 | 4/2006 | Ladner et al. |
| 2006/0190769 A1 | 8/2006 | Doddapaneni et al. |
| 2006/0212941 A1 | 9/2006 | Bronnikov et al. |
| 2006/0277607 A1 | 12/2006 | Chung |
| 2006/0288420 A1 | 12/2006 | Mantripragada et al. |
| 2007/0083933 A1 | 4/2007 | Venkatapathy et al. |
| 2008/0005782 A1 | 1/2008 | Aziz |
| 2008/0127101 A1 | 5/2008 | Anafi et al. |
| 2009/0282393 A1 | 11/2009 | Costa et al. |
| 2011/0173693 A1 | 7/2011 | Wysopal et al. |
| 2011/0231317 A1 | 9/2011 | Arsac |
| 2012/0042384 A1 | 2/2012 | Badhwar et al. |
| 2012/0066698 A1 | 3/2012 | Yanoo |
| 2012/0216177 A1 | 8/2012 | Fink et al. |
| 2012/0222123 A1 | 8/2012 | Williams et al. |
| 2012/0311713 A1 | 12/2012 | Amit et al. |
| 2013/0007885 A1 | 1/2013 | Haviv et al. |
| 2013/0007887 A1 | 1/2013 | Haviv et al. |
| 2013/0031531 A1 | 1/2013 | Keynes et al. |
| 2013/0086562 A1 | 4/2013 | Pistoia et al. |
| 2013/0239087 A1* | 9/2013 | Fox ........................ G06F 8/30 717/113 |
| 2013/0239097 A1 | 9/2013 | Pistoia et al. |
| 2014/0090070 A1 | 3/2014 | Tripp |
| 2014/0130149 A1 | 5/2014 | Tripp |
| 2014/0130153 A1 | 5/2014 | Dolby et al. |
| 2014/0130156 A1 | 5/2014 | Tripp |
| 2014/0137256 A1 | 5/2014 | Tripp |
| 2014/0173742 A1 | 6/2014 | Gluck et al. |
| 2014/0189874 A1 | 7/2014 | Beskrovny et al. |
| 2014/0282424 A1 | 9/2014 | Sheridan |
| 2014/0283081 A1 | 9/2014 | Sheridan |
| 2014/0359776 A1* | 12/2014 | Liu ..................... G06F 21/577 726/25 |
| 2015/0074803 A1* | 3/2015 | Johnson ................ G06F 21/14 726/22 |
| 2015/0319187 A1* | 11/2015 | Huang ............... H04L 63/1433 726/25 |

FOREIGN PATENT DOCUMENTS

| | | |
|---|---|---|
| EP | 2372594 A1 | 10/2011 |
| WO | 0186427 A2 | 11/2001 |
| WO | 2008047351 A2 | 4/2008 |
| WO | 2012025865 A1 | 5/2012 |
| WO | 2013098677 A1 | 7/2013 |

OTHER PUBLICATIONS

Bergeron et al., Static Detection of Malicious Code in Executable Programs, Control, 2001, pp. 184-189, Citeseer, http://citeseerx.ist.psu.edu/viewdoc/download?doi=10.1.1.102.6845&rep=rep1&type=pdf.

Lo et al., MCF: a malicious code filter*, Computers & Security, 1995, vol. 14, Issue: 6, pp. 541-566, DOI: 10.1016/0167-4048(95)00012-W.

Liu, A supportive environment for the management of software testing, Durham theses, Durham University, 1992, Available at Durham E-Theses Online: http://etheses.dur.ac.uk/5726/.

Cifuentes et al., Decompilation of Binary Programs, Software—Practice and Experience, vol. 25(7), pp. 811-829, Jul. 1995.

Cifuentes, Reverse Compilation Techniques, Dissertation, School of Computing Science, Queensland University of Technology, Jul. 1994.

Cross et al., Reverse Engineering, Advances in Computers, vol. 35, Academic Press, 1992.

Housel et al., A Methodology for Machine Language Decompilation, ACM '74 Proceedings of the 1974 annual conference—vol. 1, pp. 254-260.

Lo et al., Towards a Testbed for Malicious Code Detection, COMPCON Spring '91 Digest of Papers, 1991, DOI: 10.1109/CMPCON.1991.128800.

Macrakis, Protecting Source Code with ANDF, OSF Research Institute, Jan. 25, 1993.

Austin, et al., Dynamic Dependency Analysis of Ordinary Programs, Proceedings the 19th Annual International Symposium on Computer Architecture (1992), DOI: 10.1109/ISCA.1992.753330.

Cifuentes, et al., A Methodology for Decompilation, XIX Conferencia Latinoamericana de Informatica, Buenos Aires, Argentina, Aug. 2-6, 1993, pp. 257-266.

Wagner, et al., Intrusion Detection via Static Analysis, Proceedings 2001 IEEE Symposium on Security and Privacy, DOI: 10.1109/SECPRI.2001.924296.

Gutesman, gFuzz: An instrumental web application fuzzing environment, Corelabs, 1967, pp. 1-13, Core Security Techologies, Buenos Aires, Argentina.

(56) References Cited

OTHER PUBLICATIONS

Heelan, Applying Taint Analysis and Theorem Proving to Exploit Development, Recon 2010, pp. 1-87, Immunity, Inc.

Kang, et al., DTA++: Dynamic Taint Analysis with Targeted Control-Flow Propagation, Conference: Proceedings of the Network and Distributed System Security Symposium, NDSS 2011, Feb. 6-Feb. 9, 2011, pp. 1-14, US Berkeley, San Diego, California, USA.

Newsome, et al., Dynamic Taint Analysis for Automatic Detection, Analysis,and Signature Generation of Exploits on Commodity Software, Conference Proceeding, 2005, pp. 1-17, Carnegie Mellon Univeristy, USA.

Rawat, et al., Lightweight Static Taint Analysis for Binary Executables Vulnerability Testing, 2012, pp. 1-30, University of Grenoble, Grenoble France.

Tripp, et al., TAJ: Effective Taint Analysis of Web Applications, PLDI '09 Proceedings of the 2009 ACM SIGPLAN conference on Programming language design and implementation, 2009, pp. 87-97, IBM, New York, NY, USA.

Veracode, Addressing the Scalability Challenge with Cloud-Based Application Security, White Paper, 2014, pp. 1-13, Veracode, Burlington, MA, USA.

Veracode, Web Application Perimeter Monitoring, Fact Sheet, 2014, pp. 1-3, Veracode, Burlington, MA, USA.

Veracode, Automating Your Code Review: Moving to a SaaS Model for Application Security, White Paper, 2008, pp. 1-10, Veracode, Burlington, MA, USA.

Veracode, Binary Static Analysis, Fact Sheet, 2014, pp. 1-2, Veracode, Burlington, MA, USA.

\* cited by examiner

SOFTWARE VULNERABILITIES DETECTION SYSTEM AND METHODS

GOVERNMENT LICENSE RIGHTS

This invention was made with government support under the CyberFastTrack program documented in DARPA PA-11-53 dated Jan. 31, 2013, awarded by Defense Advanced Research Projects Agency (DARPA).

FIELD OF THE INVENTION

This invention relates generally to ensuring software security and in particular to exposing software vulnerabilities by performing static and dynamic analysis of compiled software.

BACKGROUND ART

Software security and vulnerability checking is an active field of academic and industrial pursuit. With the news of exploitation of software vulnerabilities by hackers a commonplace occurrence, it is unsurprising to see many academic and professional institutions focusing their efforts to develop tools and practices that aim to make software more secure against exploitative attacks from global hackers and adversaries.

There are many ways of detecting and addressing vulnerabilities in software in the prior art. U.S. Pat. No. 8,499,353 discloses security assessment and vulnerability testing of software applications based in part on application metadata in order to determine an appropriate assurance level and associated test plan that includes multiple types of analysis. Steps from each test are combined into a "custom" or "application-specific" workflow, and the results of each test then correlated with other results to identify potential vulnerabilities.

U.S. Pat. No. 8,365,155 describes a software analysis framework utilizing a decompilation method and system for parsing executable code, identifying and recursively modeling data flows, identifying and recursively modeling control flow and iteratively refining these models to provide a complete model at the nanocode level. The nanocode decompiler may be used to determine flaws, security vulnerabilities, or general quality issues that may exist in the code.

U.S. Pat. No. 8,739,280 describes a context-sensitive taint analysis system. Taint processing applied to a tainted value of an application is identified and an output context of the application associated with output of the tainted value is determined. It is determined whether the taint processing is effective in mitigating a security vulnerability caused by the tainted value for the output context.

U.S. Pat. No. 8,347,392 describes an apparatus and method for analyzing and supplementing a program to provide security. A computer readable storage medium has executable instructions to perform an automated analysis of program instructions. The automated analysis includes at least two analyses selected from an automated analysis of injection vulnerabilities, an automated analysis of potential repetitive attacks, an automated analysis of sensitive information, and automated analysis of specific HTTP attributes. Protective instructions are inserted into the program instructions. The protective instructions are utilized to detect and respond to attacks during execution of the program instructions.

Non-Patent reference, "Dynamic Taint Analysis for Automatic Detection, Analysis" by James Newsome and Dawn Song of Carnegie Mellon University, proposes a dynamic taint analysis solution for automatic detection of overwrite attacks. The approach does not need source code or special compilation for the monitored program, and hence works on commodity software. To demonstrate this idea, they implemented TaintCheck, a mechanism that can perform dynamic taint analysis by performing binary rewriting at run time.

Non-Patent reference, "gFuzz: An instrumented web application fuzzing environment" by Ezequiel D. Gutesman of Core Security Technologies, Argentina, introduces a fuzzing solution for PHP web applications that improves the detection accuracy and enriches the information provided in vulnerability reports. They use dynamic character-grained taint analysis and grammar-based analysis in order to analyze the anatomy of each executed SQL query and determine which resulted in successful attacks. A vulnerability report is then accompanied by the offending lines of source code and the fuzz vector (with attacker-controlled characters individualized).

One shortcoming of prior art teachings is that they suffer from poor accuracy while also at times requiring source code for analysis as opposed to just bytecode/assembly code, or they attempt to simplify the bytecode/assembly code before analysis. Other prior art work teaches running both dynamic and static analysis components in an independent or serial fashion. Furthermore earlier approaches attempt to exhaustively map all data flows in a decompiled or intermediate representation of a software system which impairs performance and slows the overall process. Relatedly, prior art teachings do not provide for advantages afforded by concurrent multi-core or multi-CPU processing infrastructure that is commonplace these days, to allow for distributed analysis of very large target software systems with high precision.

OBJECTS OF THE INVENTION

In view of the shortcomings of the prior art, it is an object of the present invention to provide for high-precision software analysis system and methods that do not require the source code of the analyzed program.

It is another object of the invention to not require an exhaustive processing of all dataflows in a program but rather than the ones that include unsafe data.

It is another object of the invention to not rely on decompliation of executable binary code.

It is yet another object of the invention to allow for distributed processing of the analysis framework taught by the invention by taking advantage of a multi-CPU or multi-core processing environment, consequently allowing for analysis of very large target software systems with efficiency and high precision.

Still other objects and advantages of the invention will become apparent upon reading the detailed description in conjunction with the drawing figures.

SUMMARY OF THE INVENTION

The objects and advantages of the invention are secured by a system and methods of detecting software vulnerabilities in a computer program by analyzing the compiled code of that computer program. The invention optionally uses the source code of the computer program in conjunction with the compiled code, but having the source code is not a requirement of the invention. The invention teaches utilizing an instruction model for each instruction of the compiled code. The instruction model for a given instruction includes the instruction location, debug information, instruction type, operands, existing memory state requirements, bytecode metadata, potential security attributes, basic block membership and function/method membership if applicable of that instruction.

The invention further uses a control flow graph for each instruction that complements the instruction model of that instruction, and includes all potential control flow paths, and a bidirectional list of predecessor instructions of that instruction. Preferably, the compiled code is instrumented at random and critical points in the code. There is a data flow model to record the flow of unsafe data during the execution of the program. The system has the means to analyze the data flow model and to create a security finding corresponding to each instruction that calls an unsafe function on unsafe data. These security findings are aggregated in a security report along with the corresponding debug information and the optional source code information for each instruction that triggered the security finding.

In the preferred embodiment of the invention, the instruction model also includes placeholders for additional attributes. These additional attributes may include information for pointer aliases or unsafe dataflow. The pointer alias information may include an aliasing map containing pointers that have the same address values given a subset of or all possible control flows of the instructions of the compiled code.

In another embodiment, the instruction model also contains attributes that are deduced from other attributes of the instruction model. These derived attributes may include values for memory locations, processor registers and variable types associated with the given instruction of the instruction model. In another preferred embodiment, the flow of unsafe data is recorded in a data flow file that utilizes a common file format such as XML, based on which the data flow model is at least partially populated. In an advantageous embodiment of the invention, an analyzer module is used to analyze the instruction model, control flow graph and the data flow model to detect software vulnerabilities in the compiled code.

In a highly advantageous embodiment of the invention, a set of concurrent worker threads are spawned that take advantage of a multi-core or multi-node or multi-machine or multi-CPU processing platform, to analyze instructions where an unknown or unsafe external input (or taint) data is provided to the program and an unsafe function or method is called upon it. In another preferred embodiment of the system, the security findings in the security report also contain a full trace of the unsafe data at the instruction that triggered the security finding, along with the line numbers of the source file if available, a human-readable description of the finding, a risk rating and optionally one or more recommendations to address the security finding.

The methods of the invention further provide the steps required to carry out the operation of the system. The invention teaches the steps required to detect software vulnerabilities of a computer program by taking as input the compiled code of the program, and optionally its source code. It then creates an instruction model and a control flow graph for each instruction in the compiled code. If further creates a data flow model to record the flow of unsafe data during the execution of the compiled code. The compiled code is instrumented at random and critical control flow points of the program.

For a given instruction, the instruction model includes the location, debug information, instruction type, operands, existing memory state requirements, bytecode metadata, potential security attributes, basic block membership, function/method membership if applicable and class membership of the given instruction. The instruction model also includes placeholders for additional attributes, including pointer aliasing information, unsafe data flow information and attributes that are deduced from other attributes including values of memory locations, values of processor registers and variable types for the given instruction.

For each instruction, the control flow graph is populated with all potential control flow paths, and a bidirectional list of predecessor instructions. Finally, for each instruction, the data flow model is populated by running the compiled code with the instrumentation at least once and recording the flow of unsafe data for each run. In another preferred embodiment, this recording of unsafe data flow is first done in a data flow file in a common file format such as XML, and the population of the data flow model is based on the data flow file.

The compiled code is scanned according to the methods provided by the invention to find each instruction where an external input is supplied to the program, denoting unknown, unsafe data. If that instruction calls an unsafe function on the unsafe data, this triggers the creation of a security finding. As the analysis is performed, all security findings are aggregated in a security report.

In the preferred embodiment, each security finding in the security report includes the debug information for the instruction that triggered the finding, along with the line numbers of the source code if available, a trace of the unsafe data from its origin to termination, identifier values of any processor registers or variables containing the unsafe data, a description of the security finding, a risk rating, and optionally one or more recommendations to address/remedy the security finding. Appropriate highlighting of these elements in the security report is also performed to make the report visually presentable, readable and easy to consume.

In another advantageous embodiment, three lists are created for each instruction. These lists are Unsafe1, Unsafe2 and Unsafe3. All instructions that are determined to be unsafe i.e. they use unsafe data by calling an unsafe function, are added to a list called Worklist. A set of concurrent worker threads are spawned, each thread selecting and processing an instruction at random from Worklist. Based on the control flow graph and data flow model earlier created, for each instruction in Worklist, Unsafe1 list is populated with incoming unsafe data at that instruction, Unsafe2 list with unsafe data currently being processed by that instruction, and Unsafe3 list with unsafe data that has been fully processed by that instruction. As the worker threads process the instructions, the contents of the three lists for each instruction are updated based on the control flow graph of that instruction as data flows from its Unsafe1 list to Unsafe2 list to Unsafe3 list and into the Unsafe1 list of the downstream instruction. If new unsafe data is added to the Unsafe1 list of an instruction that calls an unsafe function, it is re-added to the Worklist and a security finding is generated, and the above process is repeated. Ultimately, the spawning of worker threads is concluded when there are no more unsafe instructions left in Worklist, or a predetermined timeout period has elapsed during the above processing.

Concurrency locks are provided for each of the three lists, Unsafe1, Unsafe2 and Unsafe3 above, and at each step of the above processing, these locks are used to ensure the integrity of the contents of these lists. When a list is no longer being used, its concurrency lock is released (unlocked).

In a highly advantageous embodiment, worker threads are distributed across a multi-core or multi-processor or multi-CPU processing environment to improve the performance of the analysis and to allow processing of very large target software programs. In a similarly advantageous embodiment, the traversal of the control flow graph by the worker threads is performed according to custom unsafe data propagation rules provided by the user. In another advantageous embodiment the security findings are created by an analyzer module.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
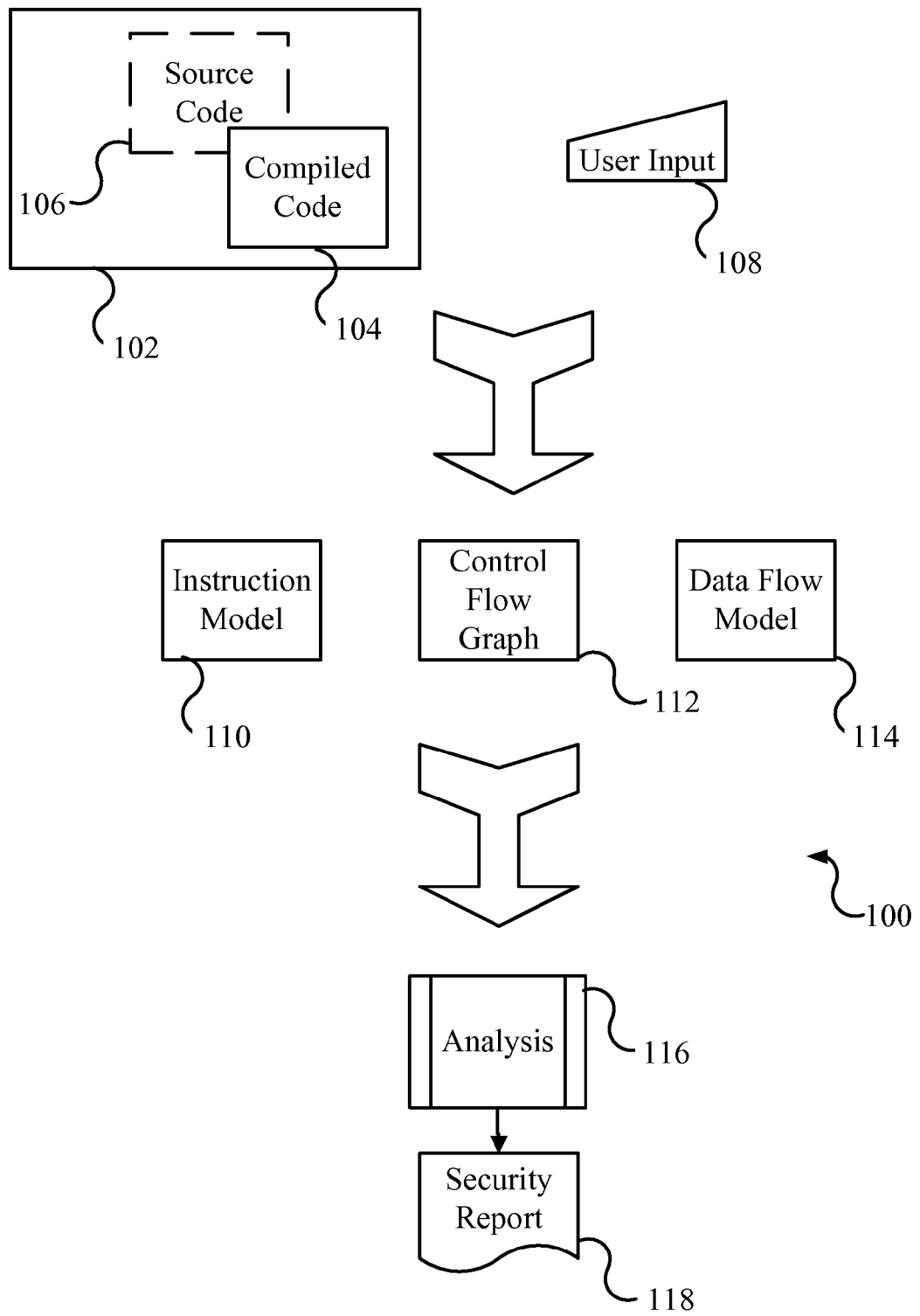
FIG. 1 is a block diagram view of the software vulnerabilities detection system according to the current invention.

The present invention will be best understood by first reviewing the software vulnerabilities detection system 100 according to the current invention as illustrated in FIG. 1. Vulnerabilities detection system 100 comprises computer program 102 in the form of its compiled code 104 and optionally source code 106 that resulted in its compiled code 104. Computer program 102 is the target program to be analyzed by system 100 for software vulnerabilities. Having source code 106 is desirable but not required by software vulnerabilities detection system 100 according to the invention. Vulnerabilities detected by system 100 in computer program 102 may allow exploitative attacks by potential adversaries or hackers. Such attacks include, but are not limited to denial of service attacks, code injection attacks and $2^{nd}$ order attacks such as cross-site scripting (XSS) attacks.

Software vulnerabilities detection system 100 comprises instruction model 110, control flow graph 112 and data flow model 114. Based on instruction model 110, control flow graph 112 and data flow model 114, software vulnerabilities detection system 100 performs analysis 116 to produce security report 118 comprising the security findings discovered during analysis 116.

Readers with average skill in the art will understand that compiled code 104 can be executable binary code, machine code, or object code that can run directly on a hardware platform such as x86, Sparc, Mac, HP, IBM Mainframe, etc. or it can be an intermediate bytecode or portable code that can run in a given runtime environment such as Java Virtual Machine (JVM). Source code 106 can be in any programming language such as C, C++, Java, Assembly, Cobol, SQL, etc. Furthermore, source code 106 can be in any $2^{nd}$, $3^{rd}$, $4^{th}$ or higher generation programming language without departing from the principles of the invention. A highly advantageous feature of the current invention is that source code 106 is desirable, but not required to achieve the objects of the invention. Not requiring the presence of source code 106 overcomes many practical limitations of the prior art.

Instruction model 110 is a programming construct used by the invention to model each instruction of compiled code 104. This programming construct comprises all the necessary and desirable attributes required by system 100 to model each instruction of compiled code 104. These attributes include the location (e.g. base address and relative memory location of the instruction), debug information if available (e.g. variable name annotations and/or source code line annotations), type of the instruction (e.g. mov, add, sub), its operands (e.g. eax register, an integer immediate value, operand stack reference, local value reference), its potential security attributes.

Figure 2:
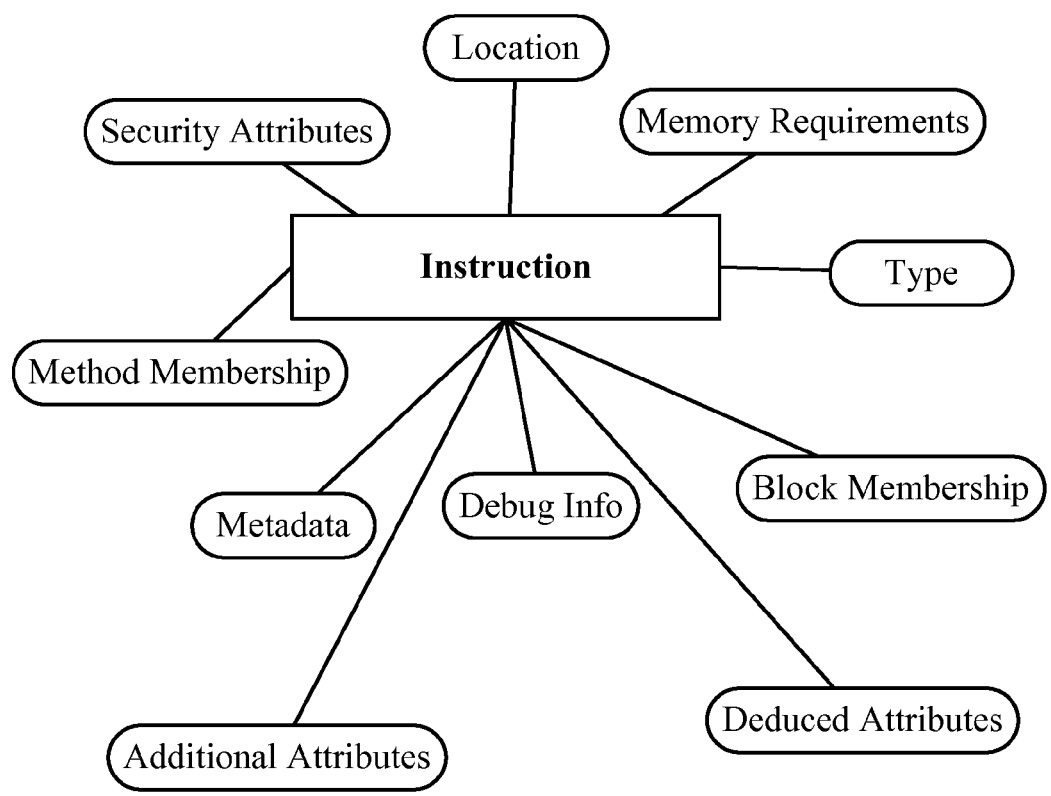
FIG. 2 is a conceptual diagram of the instruction model according to the current invention.

These attributes further include existing memory state requirements of the instruction (e.g. basic block derived invariant conditions), basic block membership (e.g. start and end references for all basic blocks encompassing an instruction), function/method membership (e.g. what functions/methods the instructions belongs to) and/or class membership (e.g. which object classes the instruction belongs to) if applicable. Those with average skill in the art will find these attributes familiar from the fundamentals of software engineering and computer programming. FIG. 2 provides a conceptual representation of instruction model 110 using a familiar notation for data structures and member associations in computer programming.

Referring to FIG. 1, during the execution of compiled code 104, user input 108 may be provided by the operator or user of computer program 102 whose vulnerabilities are to be detected. Those familiar with the art will understand that user input 108 represents a potential security risk for computer program 102 as it may intentionally or otherwise, violate the bounds of a program variable which may affect the integrity of computer program 102 or the data it is operating on. Thus user input 108 represents 'taint' or unsafe data, as will be understood by skilled people of the art. User input 108 can be provided in many different ways, for example, via a web form and keyboard, a file, an input/output buffer or stream, a pipe, screen redirect, etc.

Compiled code 104 according to the invention is preferably instrumented at random and critical control flow points of the program. Those familiar with the art will understand that instrumentation may refer to code instructions and metadata augmented to the computer program that allow monitoring of its behavior, performance and operation more closely than during normal execution, and may generate additional logging and debug output to the screen or files as desired. As provided by the invention, computer program 102 is preferably instrumented at random points within the program. Instead of or in addition to that, the program is also preferably instrumented at points where there is a critical control flow transition in the program.

Those familiar with the art will understand that there are many ways to determine these points where instrumentation may be provided in computer program 102. In a preferred embodiment, instructions in compiled code 104 can be randomly selected for instrumentation. Alternatively or in addition, a pre-processor can be used to determine the critical control flow points in program 102 prior to its execution, and then instrumentation can be added at those points in program 102. Indeed, it is allowed by the invention to instrument entire or none of computer program 102, without departing from the principles of the invention. The instrumentation of program 102 allows observing and modification of unsafe data as it flows through program 102 according to the teachings of the invention.

Figure 3:
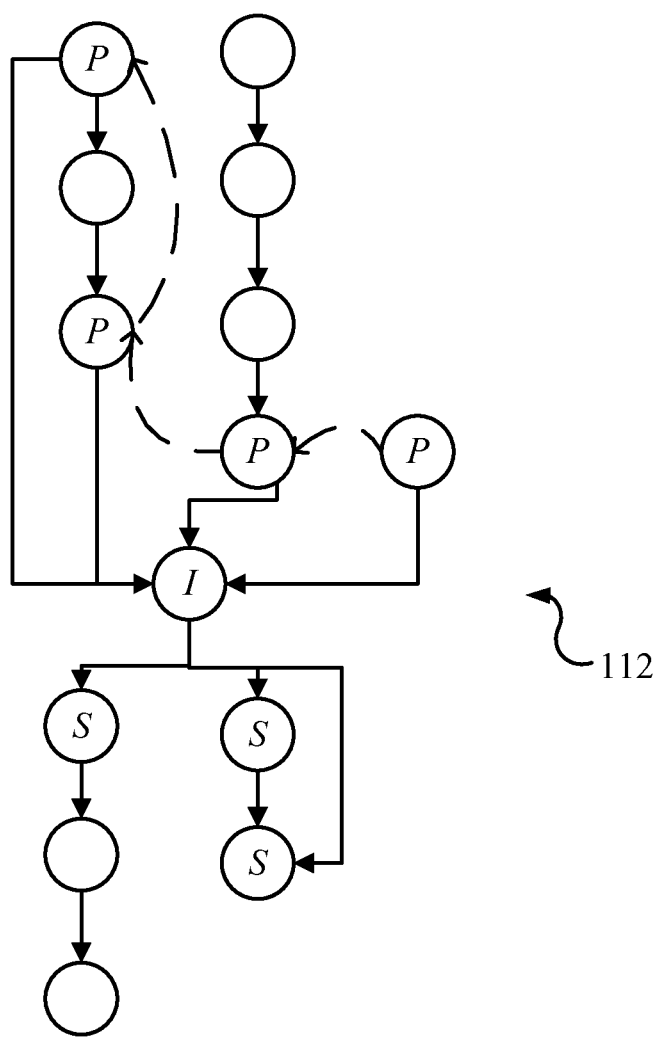
FIG. 3 is a diagram of the control flow graph of an instruction according to the invention.

The invention further uses control flow graph 112 for each instruction that complements instruction model 110 of that instruction. Control flow graph 112 for a given instruction of compiled code 104 is populated with all potential control flow paths of that instruction, assuming there is no overwriting of the underlying instructions. Control flow graph 112 for a given instruction also contains a bidirectional list of its predecessor instructions. FIG. 3 represents control flow graph 112 for an instruction I according to the teachings of the invention. In FIG. 3, each instruction is represented by a circle. Instruction I has 4 predecessor instructions P and 3 successor instructions S representing all possible control flow paths for I as shown in the figure. All P instructions will be contained in a bidirectional list in control flow graph 112 for instruction I as represented by the dashed line in FIG. 3.

Figure 4:
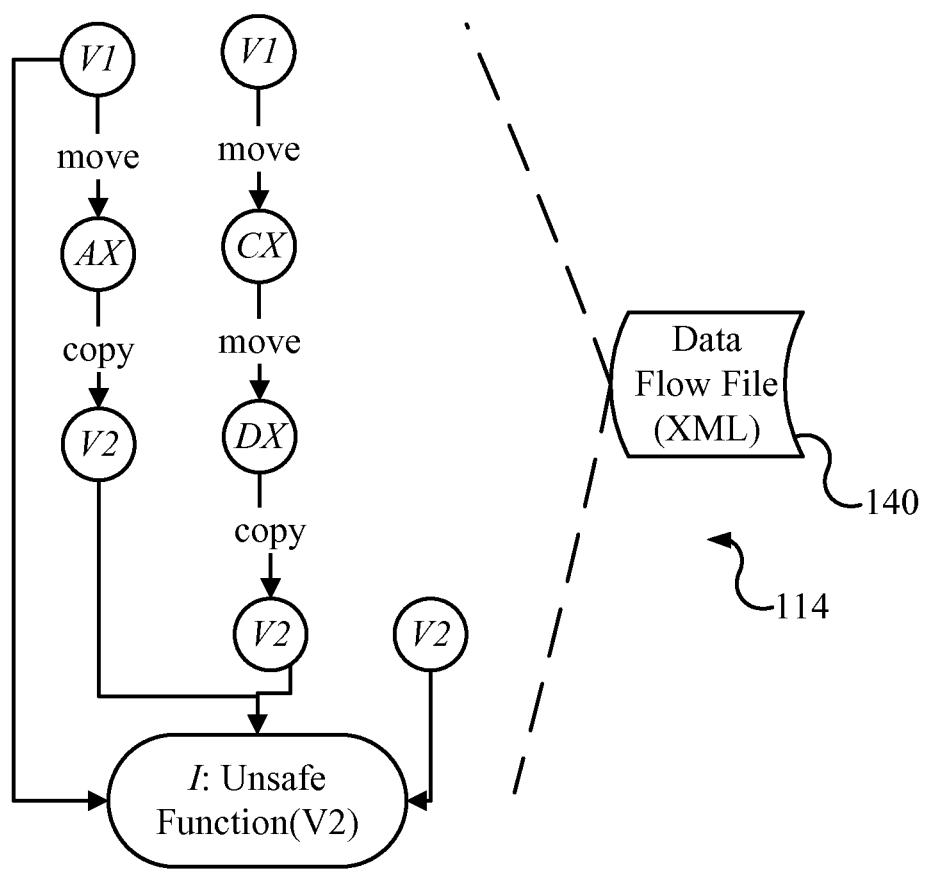
FIG. 4 is a conceptual diagram of the data flow model of an instruction according to the invention.

Referring back to FIG. 1, the invention further comprises data flow model 114. During the execution of program 102, the movement of unsafe data is recorded in data flow model 114. The movement of unsafe data, as a result of successive instructions, is recorded in data flow model 114 according to the teachings of the invention. FIG. 4 represents an example data flow model 114 populated according to the teachings of the invention.

In FIG. 4, variable V1 contains unsafe data that may have been previously supplied by user input 108 as taught earlier (see FIG. 1). Tainted data V1 is then moved to processor register AX in the next instruction of one control flow path, and then copied to variable V2. The subsequent instruction then calls an unsafe function on variable V2 representing a potential security risk in the computer program. FIG. 4 also illustrates additional control flow paths in data flow model 114 where the unsafe function call is performed on the tainted data contained in variable V2. Those familiar with the art will know the various types of unsafe function calls that may result in a potential security flaw in the code that can be exploited by an adversary. For example, in C/C++ "char*strcpy(char*dest, const char*src)" function on tainted data is an unsafe function call, because it can allow a security condition called buffer overflow to happen and damage the integrity of computer program 102 of FIG. 1, or its data, or worse allow a malicious adversary to inject harmful code or virus into the computer program.

According to the teachings of the current invention as explained above, data flow model 114 only records the flow of unsafe data during the execution of the program, as opposed to attempting to include and record all potential data flows. This significantly reduces the performance overhead and memory requirements of software vulnerabilities detection system 100, allowing it to analyze large target software systems more comprehensively than possible through the teachings of prior art. This also allows the current invention to not require decompilation of compiled code, as required by some prior art teachings.

According to the main embodiment of the invention, based on instruction model 110, control flow graph 112 and data flow model 114, all instructions in computer program 102 that call an unsafe function on unsafe data, trigger a security finding which is recorded in security report 118 as represented in FIG. 1. Each such security finding contains debug information of the instruction that triggered the security finding, along with its source code information, if available. Security report 118 exposes the vulnerabilities in computer program 102 that can be appropriately remediated to prevent exploitative attacks by amateur and professional adversaries according to the teachings of the invention.

As represented in FIG. 2, instruction model 110 further includes placeholders for additional attributes or deduced attributes that may not be immediately known at the time of the initial creation of instruction model 110. These additional attributes may include pointer aliases. Pointer aliases represent pointers that point to or contain the same memory address for multiple control flow paths of computer program 102.

In addition, instruction model 110 for a given instruction I may include information related to its predecessor instructions P as represented in FIG. 3, and any additional information or metadata as deemed necessary to facilitate recording of the flow of unsafe data as represented in FIG. 4. Furthermore, instruction model 110 may also include information deduced from other attributes. Examples of such derived attributes include memory locations or addresses, processor registers and variable type information for the given instruction based on its type, debug information and bytecode metadata.

According to an additional embodiment of the invention, analysis 116 in FIG. 1 may be performed by an analyzer module. Analyzer module may be a part of system 100 or may be external to it. If it is external to system 100, appropriate remote invocation calls or function calls or remote procedure calls (RPC) may be implemented to call the external module, as will be obvious to those skilled in the art. Indeed it is possible that the analyzer module is a $3^{rd}$ party software with its own application programming interface (API), without departing from the principles of the invention. Similarly, in a highly advantageous embodiment, analysis 116 is performed by worker threads that are spawned specifically for that purpose. These worker threads may then be distributed across a cluster of computing nodes, processors or cores, in a multi-CPU or multi-core, parallel processing environment.

Further embodiments provide security report 118 of FIG. 1 to include an execution trace of unsafe data corresponding to each security finding populated in the report. The execution trace may contain the origin and termination information for the unsafe data that ultimately caused the security finding to be triggered. For example, if unsafe data was provided as a user input in function or instruction I1 and it traversed through several intervening functions or instructions I2 . . . I9 before being discarded or reset in instruction I10, then execution trace for the corresponding security finding in security report 118 may contain the entire lifecycle or trace of that data along with the names of functions or instructions I1 ... I10.

In addition, security report 118 may contain a human friendly description of the security finding, and a risk rating or risk factor assigned to the security finding by system 100. Depending on the severity of the vulnerability associated with each finding, vulnerabilities detection system 100 may assign a risk rating from 1 to 10, or as a percentage, or use some other suitable rating system. Security report 118 may also contain one or more recommendations on how to address the security finding, or provide a 'fix' for the problem. Such recommendations and risk assignments may be based on a knowledgebase (not shown) derived from subject matter expertise in detecting and correcting such software vulnerabilities.

The methods of the invention describe the steps required to operate software vulnerabilities detection system 100 of FIG. 1. In the preferred embodiment, computer program 102 is executed at least once and the flow of unsafe data through the program is first recorded in a data flow file 140 as shown in FIG. 4. Based on the contents of data flow file 140, data flow model 114 is populated. The format of data flow file 140 can be any suitable file format, such as XML, plain text, any other markup format, or a binary (or compiled) format, without departing from the principles of the invention.

In the preferred embodiment, three lists, Unsafe1, Unsafe2, Unsafe3 are created for each instruction. Persons with average skill in the art will understand that these lists can be linked lists, arrays or any other appropriate data structures of computer software without departing from the principles of the invention. Compiled code 104 is scanned to find each instruction where an external input is supplied to the program, denoting unknown, unsafe or 'taint' data. If that instruction calls an unsafe function on the unsafe data, that instruction is added to another list, Worklist. Persons skilled in the art will again understand that Worklist can be a linked list, an array or any other suitable data structure. List Worklist 160, Unsafe1 list 180, Unsafe2 list 184 and Unsafe3 list 186 are shown in FIG. 5 along with the other elements of the invention as taught earlier.

Figure 5:
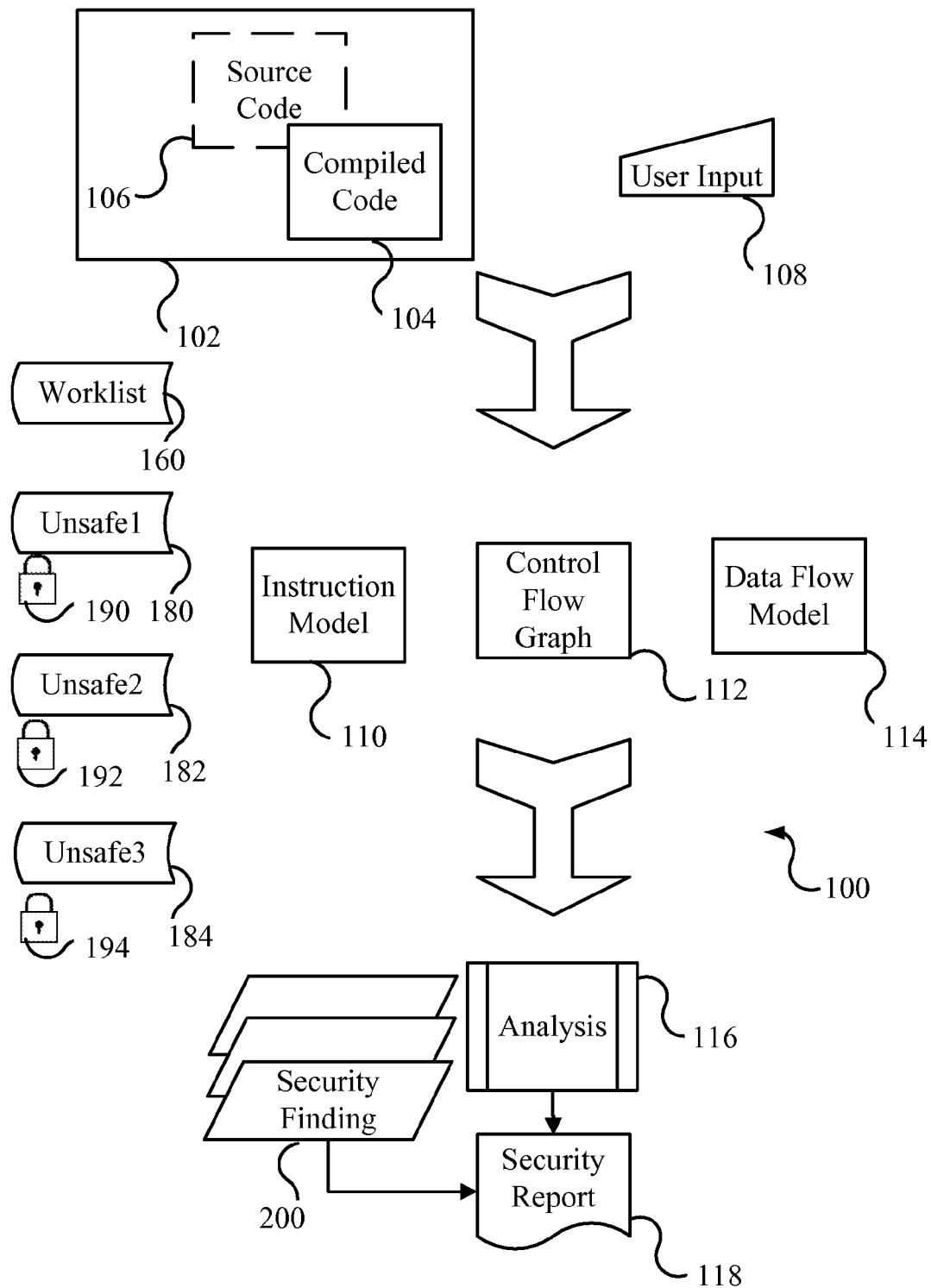
FIG. 5 is a detailed block diagram view of the elements and their workings according to the current invention.

Next, a set of concurrent worker threads are spawned, each thread selecting and processing an instruction at random from Worklist 160 of FIG. 5. Based on instruction model 110, control flow graph 112 and data flow model 114, for each instruction in Worklist 160, Unsafe1 list 180 is populated with incoming unsafe data at that instruction, Unsafe2 list 182 with unsafe data currently being processed by that instruction, and Unsafe3 list 184 with unsafe data that has been fully processed by that instruction. As the worker threads process the instructions of compiled code 104, the contents of Unsafe1 list 180, Unsafe2 list 182, Unsafe3 list 184 for each instruction are updated based on control flow graph 112 of that instruction as data flows from its Unsafe1 list 180 to Unsafe2 list 182 to Unsafe3 list 184 and into Unsafe1 list 180 of the successor instruction.

Figure 6:
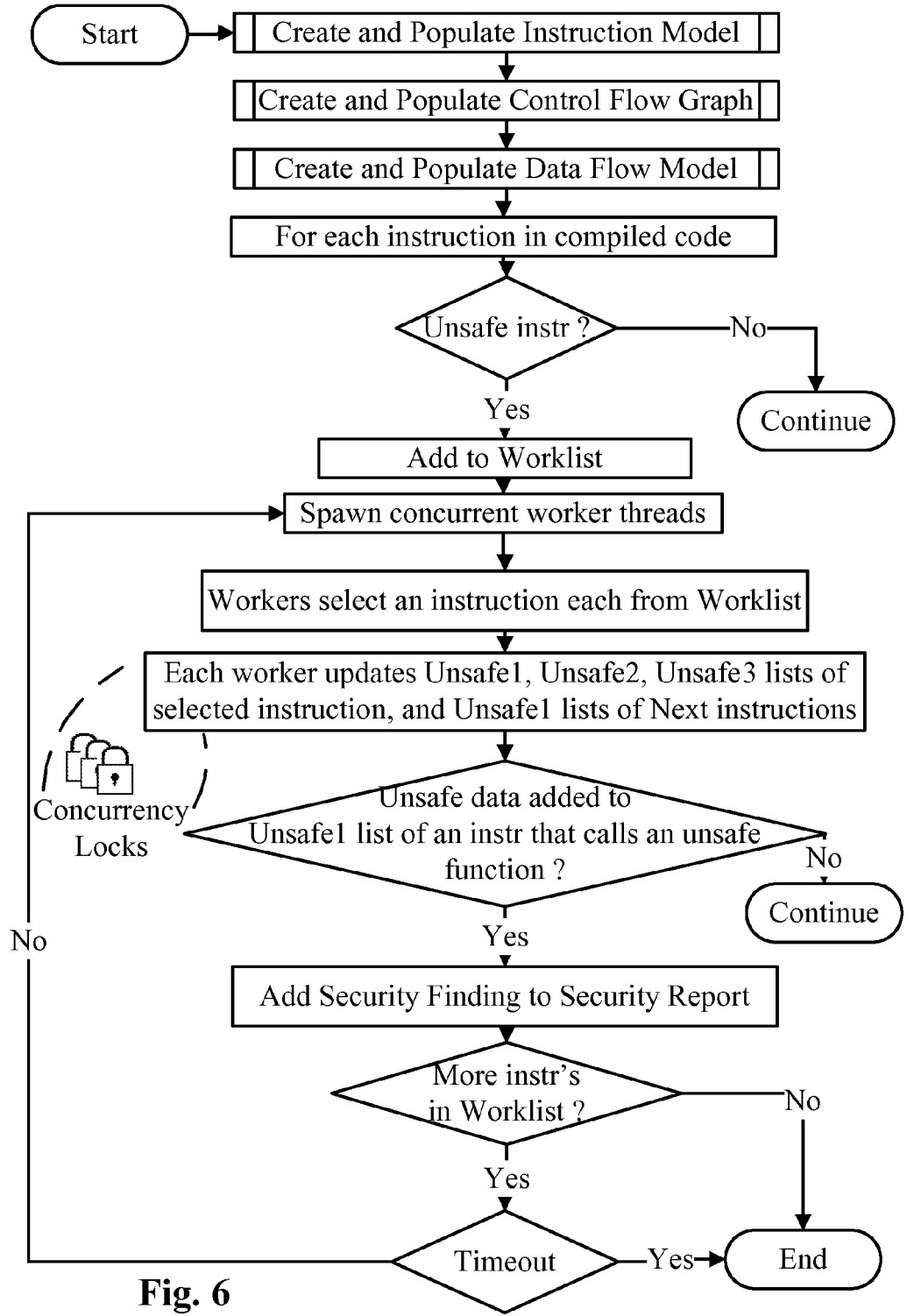
FIG. 6 is a flowchart comprising the analytical steps of the algorithm required for the detection of software vulnerabilities according to the current invention.

If new unsafe data is added to Unsafe1 list 180 of an instruction that calls an unsafe function, a new security finding 200 is created and added to security report 118 as represented in FIG. 5, and that instruction is re-added to Worklist 160, and the above process is repeated. Ultimately, the spawning of worker threads is concluded when there are no more unsafe instructions left in Worklist 160, or a predetermined timeout period has elapsed during the above processing. FIG. 6 shows the above algorithm in a flowchart format where an unsafe instruction denotes an instruction that calls an unsafe function on unsafe data as explained above, and the label instr is used to abbreviate the term instruction.

Referring to FIG. 5, concurrency locks 190, 192, 194 are provided for each of Unsafe1 list 180, Unsafe2 list 182 and Unsafe3 list 184 respectively, and at each step of the above processing, these locks are used to ensure the integrity of the contents of these lists. When a list is no longer being used, its concurrency lock is released (unlocked). Those skilled in the art will understand how the contents of Unsafe1 list 180, Unsafe2 list 182 and Unsafe3 list 184 will be updated as explained above.

Further explained, when a worker thread selects an instruction to process from Worklist 160, it locks its Unsafe2 list 182 and Unsafe3 list 184, and also temporarily locks its Unsafe1 list 180 while it imports data from its Unsafe1 list 180 to Unsafe2 list 182. The worker thread then statically analyzes the currently selected instruction to determine from its incoming unsafe data in Unsafe1 list, currently processed data in Unsafe2 list and fully processed data in Unsafe3 list, what other instructions that unsafe data may propagate to. This determination is based on the attributes of the current instruction as contained in its instruction model 110, and any other custom unsafe data propagation rules pre-defined or provided by the user.

Examples of custom unsafe data propagation rules include specifying that a function or method, e.g. execSqlStatement (String query), should never receive unsafe or "taint" user input in its first and only parameter. Such a rule could be expressed as an XML file defining regular expressions to identify the specific class and method for this call, along with a numeric value identifying that the first parameter should never be tainted or uncontrolled, along with security information defining the security impact of such a condition. Another example would be a rule which identifies that the subString(Integer from) call will propagate the value of its object instance to its return value, which could be similarly expressed in an xml file, and identifying the return value. Still other examples of custom rules include source rules, which define the insertion of uncontrolled or tainted data into a program and cleanse rules which define methods that are known to control data such that the data can afterwards be considered safe in one or more ways.

Referring back to FIG. 5 and preceding teachings, based on control flow graph 112 of the current instruction, the current worker thread aggregates all possible control flow destinations of the current instruction in a list Next_Instructions (not shown). Subsequently, for each instruction in Next_Instructions list, the current worker thread locks its Unsafe1 list and adds outgoing processed unsafe data contained in its Unsafe3 list 184, to the incoming unsafe data contained in Unsafe1 list 180 of the instruction selected from Next_Instructions list. As explained above, if unsafe data is added to Unsafe1 list of an instruction that calls an unsafe function, a security finding 200 is added to security report 118 and that instruction is re-added to Worklist 160. The above process continues until there are no more instructions left to process in Worklist 160 or a timeout period has elapsed.

In a highly advantageous embodiment, worker threads are distributed across a multi-core or multi-CPU or multi-machine or multi-node processing environment to improve the performance of the analysis and to allow processing of very large target software programs. In a similarly advantageous embodiment, the traversal of the control flow graph by the worker threads is performed according to custom unsafe data propagation rules provided by the user. In another advantageous embodiment the security findings are created by an analyzer module.

In another advantageous embodiment, security report 118 as shown in FIG. 5 contains a full execution trace of unsafe data corresponding to each security finding 200 populated in security report 118. The execution trace may contain the origin and termination information for the unsafe data that ultimately caused security finding 200 to be triggered. As an example, consider that unsafe data was provided as a user input in function or instruction I1 and it traversed through several intervening functions or instructions I2 . . . I9 before being discarded or reset in instruction I10. Then execution trace for corresponding security finding 200 in security report 118 may contain the entire lifecycle or trace of that data along with the names/labels of instructions I1 . . . I10 and filename(s) and corresponding line numbers in the source files from source code 106 if available, or obtained from debug information or assembly instructions.

If source code 106 if available. If source code 106 is available, each source file corresponding to the above trace is parsed into an abstract syntax tree or trees, and the line numbers and offsets for non-keyword identifier tokens is generated. Persons skilled in the art will understand that these non-keyword identifier tokens will represent user or custom variables, as opposed to keywords belonging to the grammar of the programming language itself. Using the abstract syntax tree or trees above, corresponding to each instruction in the trace, the identifier names and values of any variables or processor registers that contained the unsafe data is obtained using the debug information, and then added to the trace information.

In addition, security report 118 of FIG. 5 may be properly formatted to be visually appealing with proper highlighting of important pieces of information for each security finding 200, and contain a human friendly description of the finding along with a risk rating or risk factor assigned to the finding by system 100. Depending on the severity of the vulnerability associated with each security finding 200, vulnerabilities detection system 100 may assign a risk rating from 1 to 10, or as a percentage, or use some other suitable rating system. Security report 118 may also contain one or more recommendations on how to address security finding 200, or 'fix' the problem. Such recommendations and risk assignments may be based on a knowledgebase (not shown) derived from subject matter expertise in detecting and correcting such software vulnerabilities. The knowledgebase may be further designed to continuously augment its content either automatically or with human assistance or by a combination of both automatic and manual means, as vulnerabilities detection system 100 operates over time.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

I claim:

1. A software vulnerabilities detection system comprising:
a memory device storing computer-readable instructions;
a microprocessor, coupled to the memory device for executing instructions stored thereon, comprising a set of concurrent worker threads;
the microprocessor is configured to:
  a) receive compiled code and source code that resulted in said compiled code, wherein each of said concurrent worker threads processes an instruction from said compiled code where an external input is supplied;
  b) create an instruction model for each instruction of said compiled code comprising location, debug information, instruction type, operands, existing memory state requirements, bytecode metadata, potential security attributes, basic block membership, function/method membership, and class membership of each said instructions;
  c) create a control flow graph for each said instructions comprising all potential control flow paths, and a bidirectional list of predecessor instructions for each said instruction;
  d) create a data flow model comprising recorded flow of unsafe data as observed during execution of said compiled code;
  e) analyze said instruction model, said control graph and said data flow model to create a security finding for each said instruction that calls an unsafe function on said unsafe data; and
  f) generate a security report comprising each said security finding with corresponding said debug information and said source code information, and an execution trace of said unsafe data corresponding to each said security finding, wherein said execution trace comprising information from the origin to the termination of said unsafe data, and the associated line numbers from said source code information.

2. The software vulnerabilities detection system of claim 1 wherein said compiled code is instrumented.

3. The software vulnerabilities detection system of claim 2 wherein said instrumentation is done at random and critical control flow points of said compiled code.

4. The software vulnerabilities detection system of claim 1 wherein said instruction model further comprises placeholders for additional attributes, including pointer aliasing information and unsafe dataflow information.

5. The software vulnerabilities detection system of claim 4 wherein said pointer aliasing information comprises aliasing maps to determine which pointers may represent the same value given a plurality of control flows of each said instruction.

6. The software vulnerabilities detection system of claim 1 wherein said instruction model further comprises attributes deduced from other attributes, including values for memory, register and variable type of each said instruction.

7. The software vulnerabilities detection system of claim 1 further comprising a data flow file recording flow of unsafe data as it flows during the execution of said compiled code.

8. The software vulnerabilities detection system of claim 1 further comprising an analyzer module.

9. The software vulnerabilities detection system of claim 1, wherein said concurrent worker threads are executed across one or more selections from the group consisting of CPU, processor, core, computing machine and node.

10. The software vulnerabilities detection system of claim 1 wherein said security report further comprises a risk rating, a human-readable description and optionally one or more remediation recommendations, for each said security finding.

11. A method of detecting software vulnerabilities by a microprocessor comprising a set of concurrent worker threads, the method comprising the steps of:
  a) receiving compiled code and source code that resulted in said compiled code, wherein each of the concurrent worker threads processes an instruction from said compiled code where an external input is supplied;

b) creating an instruction model for each said instruction comprising location, debug information, instruction type, operands, existing memory state requirements, bytecode metadata, potential security attributes, basic block membership, function/method membership, and class membership of each said instruction;

c) creating a control flow graph associated with each said instruction model, comprising all potential control flow paths, and a bidirectional list of predecessor instructions for each said instruction;

d) creating and populating a data flow model, comprising recorded flow of unsafe data as observed during execution of said compiled code;

e) analyzing said instruction model, said control graph and said data flow model to create a security finding for each said instruction that calls an unsafe function on unsafe data; and f) generating a security report comprising said debug information and said source code information for each said security finding, and an execution trace of said unsafe data corresponding to each said security finding, wherein said execution trace comprising information from the origin to the termination of said unsafe data, and the associated line numbers from said source code information.

12. The method of detecting software vulnerabilities of claim 11 wherein said instruction model is further provided with placeholders for additional attributes, including pointer aliasing information and unsafe dataflow information.

13. The method of detecting software vulnerabilities of claim 12 wherein said pointer aliasing information comprises aliasing maps that are populated with pointers representing the same value given at least two control flows of each said instruction of said compiled code.

14. The method of detecting software vulnerabilities of claim 11 wherein said instruction model is further provided with attributes deduced from other attributes, including values for memory, register and variable type of each said instruction.

15. The method of detecting software vulnerabilities of claim 11 wherein said population of said data flow model is performed by running said compiled code at least once and recording flow of unsafe data for each said run.

16. The method of detecting software vulnerabilities of claim 11 wherein said population of said data flow model is based at least partially on a data flow file in which flow of unsafe data during the execution of said compiled code has been recorded.

17. The method of detecting software vulnerabilities of claim 11 wherein said compiled code is further instrumented at random and critical control flow points allowing observing and modification of properties of data as it flows during the execution of said compiled code.

18. The method of detecting software vulnerabilities of claim 11 further comprising the steps of:

a) creating three lists Unsafe1, Unsafe2, Unsafe3 for each said instruction;

b) scanning said compiled code to determine locations where external input is supplied and marking said locations as containing unsafe data, and further creating a Worklist of all instructions at said locations that call an unsafe function;

c) creating a set of concurrent worker threads, each thread selecting an instruction at random from said Worklist, and processing it according to said control flow graph, and said data flow model, and populating said Unsafe1 list with incoming unsafe data at said instruction, Unsafe2 list with unsafe data currently being processed by said instruction, and Unsafe3 list with unsafe data that has been fully processed by said instruction;

d) adding an instruction to said Worklist in step(c) above if said instruction has new data added to its said Unsafe1 list and said instruction further calls an unsafe function, and repeating step (c); and e) concluding said creation of said worker threads if all instructions in said Worklist have been processed as specified in steps (c) and (d), or a predetermined time has elapsed.

19. The method of detecting software vulnerabilities of claim 18 further creating a concurrency lock for each said list Unsafe1, Unsafe2 and Unsafe3.

20. The method of detecting software vulnerabilities of claim 19 further applying said concurrency locks to ensure integrity of said data populated in said lists Unsafe1, Unsafe2, Unsafe3.

21. The method of detecting software vulnerabilities of claim 19 releasing each said concurrency lock corresponding to each said list Unsafe1, Unsafe2 and Unsafe3, if said list is not in use.

22. The method of detecting software vulnerabilities of claim 18 wherein step 20(c) is further performed according to custom unsafe data propagation rules provided by user.

23. The method of detecting software vulnerabilities of claim 11, wherein said execution trace further comprises the identifier value of any register or variable containing said unsafe data.

24. The method of detecting software vulnerabilities of claim 23 wherein said security report highlights at least one said identifier and variable associated with said unsafe data.

25. The method of detecting software vulnerabilities of claim 11 wherein said security report is further provided with a risk rating, a human-readable description of each said security finding and one or more remediation recommendations for each said security finding.

26. The method of detecting software vulnerabilities of claim 11 wherein said concurrent worker threads are executed across at least one CPU or processor or core or computing machine or node.

* * * * *